United States Patent
Roeder et al.

(10) Patent No.: US 7,160,033 B2
(45) Date of Patent: Jan. 9, 2007

(54) FERRULE FOR A LIGHT GUIDE

(75) Inventors: Juergen Roeder, Grebenstein (DE); Martin Herlitz, Remscheid (DE); Peter P. Schekalla, Wuppertal (DE); Juergen Pscheidt, Schwelm (DE)

(73) Assignee: Delphi Technologies, Inc., Troy, MI (US)

( * ) Notice: Subject to any disclaimer, the term of this patent is extended or adjusted under 35 U.S.C. 154(b) by 106 days.

(21) Appl. No.: 11/087,397

(22) Filed: Mar. 23, 2005

(65) Prior Publication Data

US 2005/0249467 A1 Nov. 10, 2005

(30) Foreign Application Priority Data

Mar. 23, 2004 (GB) .................. 0406490.3
May 11, 2004 (EP) .................. 04011172

(51) Int. Cl.
*G02B 6/36* (2006.01)
*B29D 11/00* (2006.01)

(52) U.S. Cl. .................. 385/78; 385/77; 385/84; 264/1.24; 264/1.25; 264/1.6; 264/1.7

(58) Field of Classification Search .................. 385/53, 385/60, 66, 70, 72, 77, 78, 84, 85, 141; 264/1.1, 264/1.24, 1.25, 1.6, 1.7
See application file for complete search history.

(56) References Cited

U.S. PATENT DOCUMENTS 4,649,616 A * 3/1987 Bricker et al. .................. 29/406
5,193,133 A * 3/1993 Schofield et al. .................. 385/85
5,372,758 A * 12/1994 Lundstrom et al. .................. 264/1.25
6,435,731 B1 * 8/2002 Yamaguchi et al. .................. 385/78
6,832,857 B1 * 12/2004 Okuma et al. .................. 385/60
2003/0077042 A1 * 4/2003 Okuma et al. .................. 385/60

FOREIGN PATENT DOCUMENTS

| DE | 19851867 | 5/2000 | .............. 385/78 X |
| DE | 19961803 | 11/2000 | .............. 385/78 X |
| DE | 10044585 | 4/2002 | .............. 385/78 X |
| EP | 1306705 | 5/2003 | .............. 385/78 X |
| JP | 2000-111758 | 9/2000 | .............. 385/78 X |

* cited by examiner

Primary Examiner—Brian M. Healy
(74) Attorney, Agent, or Firm—David P. Wood

(57) ABSTRACT

A ferrule for a light guide comprises a continuous metal sleeve which has a first tubular section and, at an axial spacing therefrom, a coaxial second tubular section which are connected to one another via an intermediate section, and a first plastic molded part formed around the free end of the first tubular section and a second plastic molded part which is provided at an axial spacing therefrom and which is formed around the ends of the two tubular sections adjacent to the intermediate section and around the intermediate section.

22 Claims, 5 Drawing Sheets

FERRULE FOR A LIGHT GUIDE

TECHNICAL FIELD

The invention relates to a ferrule for a light guide, to a light guide with an associated ferrule and to a method for the mounting of a ferrule on a light guide.

BACKGROUND OF THE INVENTION

The previously customary light guides in the automotive sector comprise a plastic core and one or more sheathing layers. An end connection piece or a ferrule is attached to the end of the light guide to be able to connect the light guide to another light guide or to a light transmission and/or light reception device. The previous ferrules in the automotive sector are as a rule made of plastic molded material. The light guide core as a rule has a diameter in the range of 1 mm.

With respect to greater flexibility and to an improved transmission, there is a desire for the use of a light guide core consisting of glass fiber material with a much smaller diameter of, for example, approximately 200 µm in comparison to the previously customary diameters. In view of the manufacturing tolerances, the previously customary ferrules are, however, unsuited for use of such smaller light guide cores. The customary precision ferrules used in the telecommunications sector are extremely complicated, complex and made up of a plurality of individual parts to a large extent, in particular for applications in the automotive sector, so that they are relatively expensive.

SUMMARY OF THE INVENTION

It is the underlying object of the invention to provide an improved ferrule of the initially named kind with which the aforesaid problems have been eliminated. A correspondingly improved light guide with an associated ferrule should moreover also be provided and a correspondingly improved method for the mounting of a ferrule on a light guide should be recited.

On the one hand, this object is satisfied in accordance with the invention by a ferrule for a light guide having a continuous metal sleeve which has a first tubular section and, at an axial spacing therefrom, a coaxial second tubular section which are connected to one another via an intermediate section, and having a first plastic molded part formed around the free end of the first tubular section and a second plastic molded part which is provided at an axial spacing therefrom and which is formed around the ends of the two tubular sections adjacent to the intermediate section and around the intermediate section.

A stable and very robust shape of the ferrule is achieved with such a one-part composite ferrule, with the mechanical connection taking place by means of the metal sleeve and the guidance and positioning in the hollow space of the ferrule being ensured by the two plastic molded parts. In addition, no edges or steps occur at the interior of the ferrule.

The first tubular section preferably has a smaller internal diameter than the second tubular section. The end region of the light guide relieved at least partly from one or more sheathing layers can therefore be accommodated in the first tubular section, whereas the relevant light guide section in the second tubular section can comprise at least one sheathing layer more.

In a preferred practical embodiment of the ferrule in accordance with the invention, the first plastic molded part has a passage opening coaxial to the two tubular sections of the continuous metal sleeve.

The first plastic molded part can project beyond the free end of the first tubular section of the continuous metal sleeve.

The passage opening preferably has a smaller internal diameter than the two tubular sections of the continuous metal sleeve. This passage opening can therefore take up an end section of a light guide which is, for example, completely stripped or, for example, only provided with one jacket, with the internal diameter of the passage opening then being correspondingly adapted to the smaller external diameter of the respective end section of the light guide. A positioning of the light guard by the first plastic molded part thus also in particular takes place.

The first plastic molded pan can moreover be provided with an outer lip. Such an outer lip can, for example, serve for the positioning of the ferrule in the respective connector pan of a respective plug-in connector.

The wall of the first tubular section of the metal sleeve is preferably provided with openings into which some of the material of the font plastic molded part engages In a preferred practical embodiment of the ferrule in accordance with the invention, exposed regions of the two tubular sections of the metal sleeve are crimped to the light guide.

The two plastic molded parts can be formed by a high-precision polymer such as in particular a liquid crystal polymer (LCP).

The ferrule is expediently made from a stamped part in which at least the two tubular sections are produced by subsequent rolling.

The aforesaid object is moreover satisfied by a light guide with which a ferrule in accordance with any one of the claims 1 to 11 is associated.

The core of such a light guide preferably consists of glass fiber. A core of PCS (polymer clad silica) is advantageously provided.

The diameter of the core of the light guide can lie, for example, in . a range from approximately 9 to 1,000 µm, with it preferably lying, however, in a range from approximately 200 µm.

The light guide can be provided a least regionally with at least one sheathing layer such as in particular a jacket layer, a buffer layer and/or an outer layer.

In the region of the first tubular section of the metal sleeve, the light guide can, for example, still be provided with a jacket layer or with one such jacket layer and a buffer layer, with the internal diameter of the first tubular section of the metal sleeve being substantially equal to the external diameter of the jacket layer or of the buffer layer.

In the region of the second tubular section of the metal sleeve, the light guide can, for example, still be provided at least with one jacket layer, a buffer layer and an outer layer, with the internal diameter of the second tubular section of the metal sleeve being substantially equal to the external diameter of the outer layer.

The method for the mounting of a ferrule on a light guide comprises the following method steps in accordance with the invention:

stamping the metal sleeve out of a metal sheet;
forming the two tubular sections of the metal sleeve having an axial spacing from one another by rolling the stamped part;

molding the first plastic molded part around the free end of the first tubular section of the metal sleeve and molding the second plastic molded part around the ends of the two tubular sections adjacent to the intermediate section and around the intermediate section of the metal sleeve.

The stamped part can be formed on a conveyor chain or conveyor strip and the metal sleeve can be separated from the conveyor chain or conveyor strip after the molding (injection molding) of the two plastic molded parts around the two tubular sections has taken place, with a separation e.g. only being feasible directly prior to the fitting with the end of the light guide.

The free end of the light guide is preferably inserted into the ferrule from the second tubular section of the metal sleeve up to the passage opening of the first plastic molded part or beyond it.

After the insertion of the free end of the guide, the exposed regions of the two tubular sections of the metal sleeve are preferably crimped to the light guide.

After the crimping, the free end of the light guide can be cut off and worked.

In particular glass fibers such as preferably PCS (polymer clad silica) can therefore now be used for very fast data transmission by means of laser light. A one-part composite ferrule is proposed for a separation position of optical leads. A metal sleeve is produced by stamping and rolling and a polymer is molded around it at two positions, whereby a stable and very robust shape of the ferrule is achieved. The following specific functions are expediently realized independently of one another among others:

- the mechanical connection is effected by means of a metal sleeve;
- a defined crimp region closed at both sides;
- a precise positioning of the optical lead by the front plastic cylinder formed by the first plastic molded part;
- guidance and position in the reception of the ferrule by the two plastic molded parts;
- no edges or steps at the interior of the ferrule.

The invention can in particular be used for glass fiber systems, for example in the automotive sector. In particular the use of PCS (polymer clad silica) is possible as the transport medium for multimedia applications. An extremely robust design in particular results in that all relevant functions are integrated. In particular high precision ferrules with a core diameter range of, for example, approximately 200 µm can now be realized in glass fiber (e.g. PCS). Stamping and molding are some of the essential method steps in the mounting of the ferrule. The positioning and aligning of a ferrule with respect to another VCSL (vertical cavity service emitting laser) takes place via a high-precision polymer such as a liquid crystal polymer (LCP). The mounting of the light guide takes place via a double molding around a metal sleeve crimped to the light guide. The respective ferrule brings along the following advantages, among others:

- a stable and robust design;
- high precision;
- guidance in the reception of the ferrule;
- defined and protected crimp regions;
- no sharp corners within the ferrule;
- transport strips for automatic mounting possible.

BRIEF DESCRIPTION OF THE DRAWINGS

The invention will be explained in more detail in the following with reference to embodiments and to the drawing; there are shown in it.

DESCRIPTION OF THE PREFERRED EMBODIMENT

Figure 1:
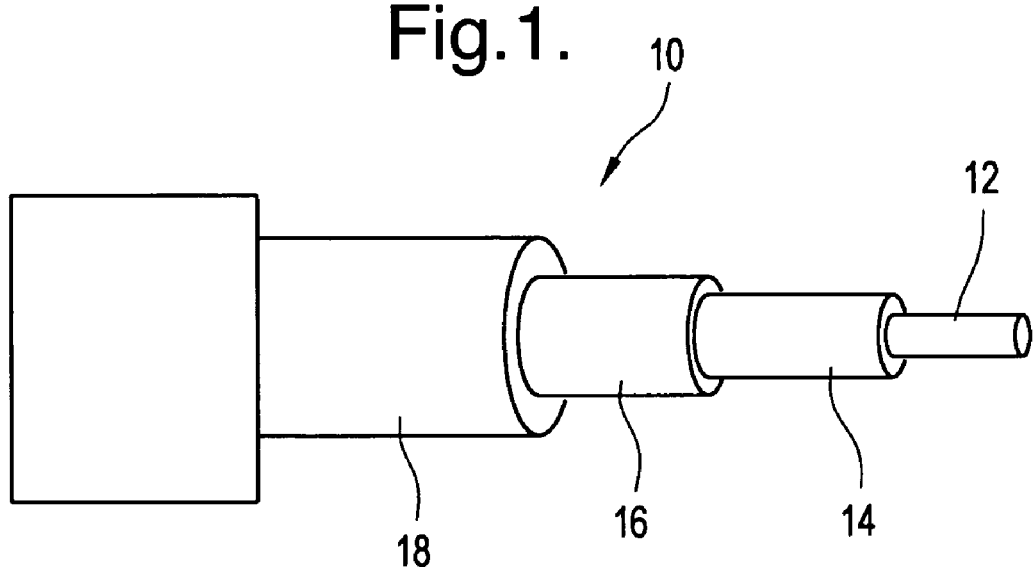
FIG. 1 is a perspective view of a light guide before the attachment of a ferrule in accordance with the invention.

FIG. 1 shows a light guide 10 before the attachment of a ferrule in accordance with the invention in a perspective view. This light guide 10 comprises, for example, a light guide core 12 consisting of fiber material, a jacket layer 14, a buffer layer 16 (preferably black) and an outer envelope 18. The light guide core 12 preferably consists of glass fiber material and it preferably has a diameter in the range of approximately 200 µm.

Figure 2:
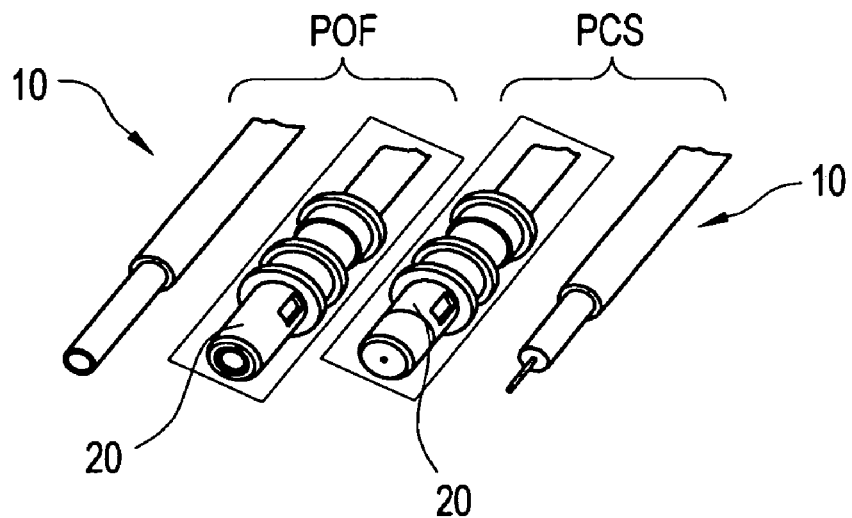
FIG. 2 is perspective views of the light guide in accordance with FIG. 1 with and without the ferrule in accordance with the invention.
Figure 3:
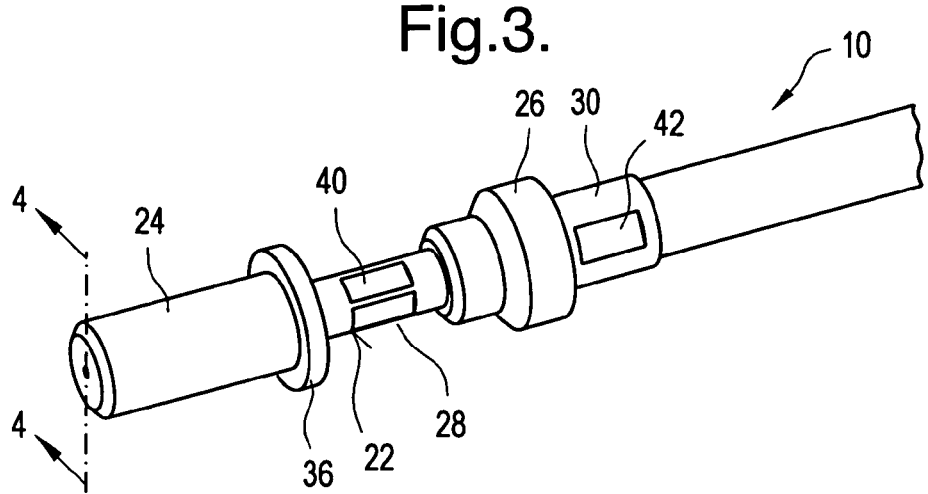
FIG. 3 is a perspective view of the light guide in accordance with FIG. 1 with the ferrule in accordance with the invention attached thereto.
Figure 4:
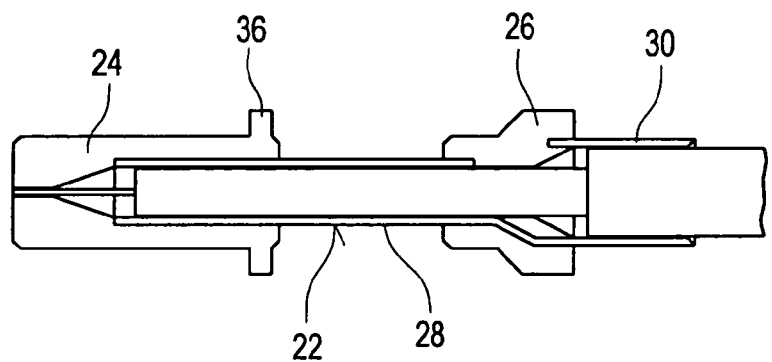
FIG. 4 is a cross-sectional representation of the light guide in accordance with FIG. 3 with the associated ferrule, sectioned along the line 4—4 in FIG. 3.

FIG. 2 shows perspective views of the light guide 10 with and without the ferrule 20 in accordance with the invention. A corresponding ferrule 20 is in particular also shown in FIGS. 3 to 5 and 7. According to this, the ferrule 20 comprises three parts, namely a metal sleeve 22 and a first and a second plastic molded part 24, 26, which are preferably molded from a high precision polymer such as a liquid crystal polymer (LCP).

The continuous metal sleeve 22 comprises a tubular section 28 and, in an axial section thereof, a coaxial second tubular section 30 which are connected via an intermediate section 32.

The first plastic molded part 24 is formed around the free end of the first tubular section 28 and the second plastic molded part 26 provided at an axial spacing therefrom is formed around the ends of the two tubular sections 28, 30 adjacent to the intermediate section 32 and around the intermediate section 32.

In the present case, the first tubular section 28 has a smaller internal diameter than the second tubular section 30. As can in particular be recognized with reference to FIG. 6, the intermediate section 32 can be open over some of its periphery and can, for example, have a conical extent.

Figure 5:
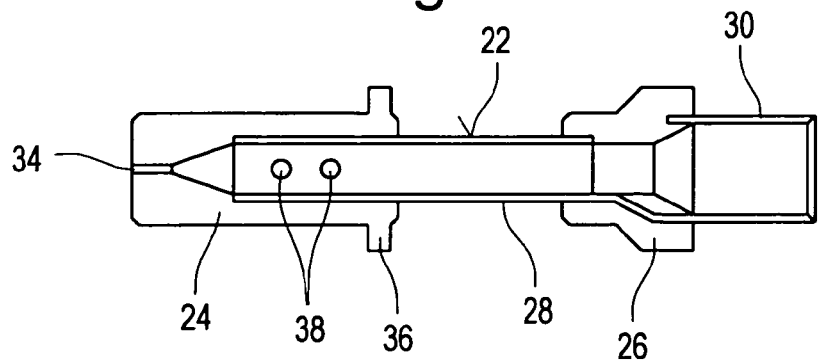
FIG. 5 is a cross-sectional representation of the ferrule shown in FIG. 3.
Figure 6A:
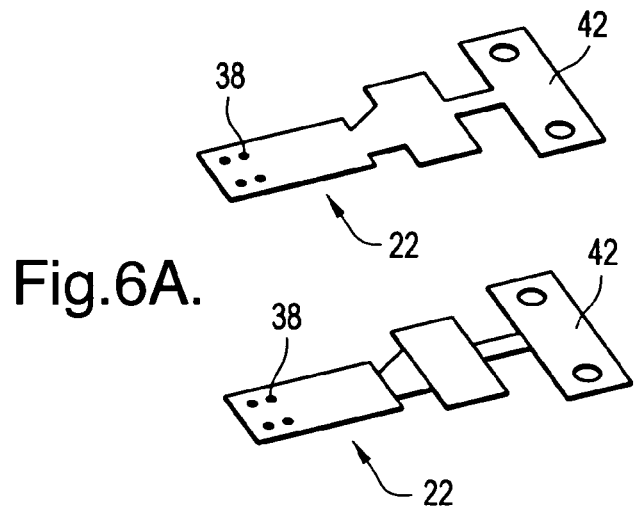
FIG. 6 is individual steps of the method in accordance with the invention for the mounting of the ferrule on the light guide.
Figure 6B:
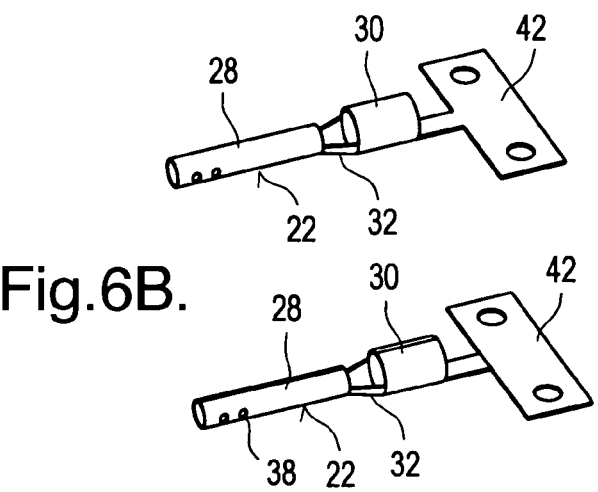
Figure 6C:
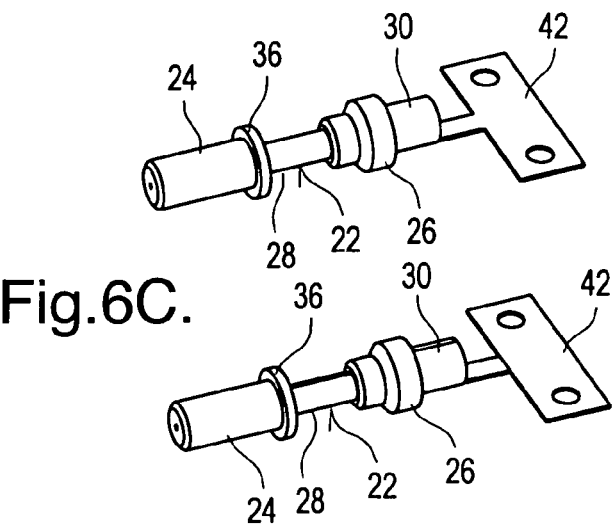
Figure 6D:
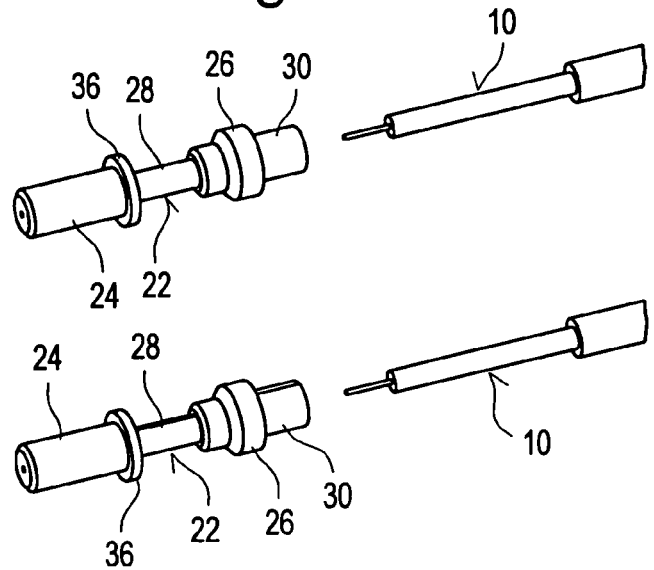
Figure 6E:
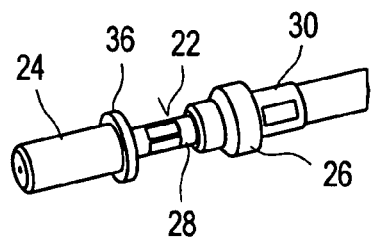
Figure 6E:
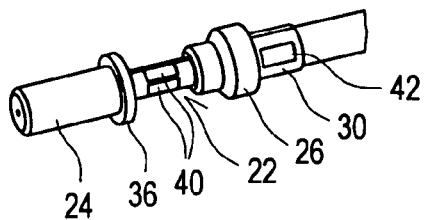
Figure 6E:
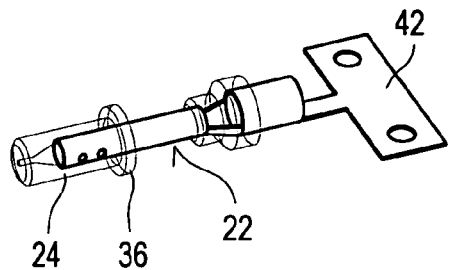

As results in particular from FIG. 5, the first plastic molded part 24 has a passage opening 34 coaxial to the two tubular sections 28, 30 of the continuous metal sleeve 22. In the present case, the first plastic molded part 24 projects beyond the free end of the first tubular section 28 of the continuous metal sleeve 22, with the passage opening 34 being provided in the region of the free end of the projecting part.

The passage opening 34 has a smaller internal diameter than the two tubular sections 28, 30 of the continuous metal sleeve 22 in adaptation to the respective fiber diameter.

At least the first plastic molded part 24 can be provided with an outer lip 36.

Figure 7:
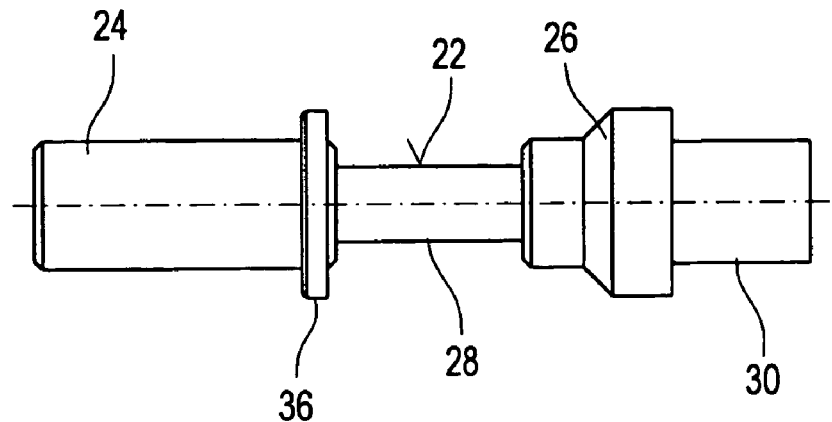
FIG. 7 is a side view, a cross-sectional representation and a perspective view of the ferrule in accordance with the invention.
Figure 7:
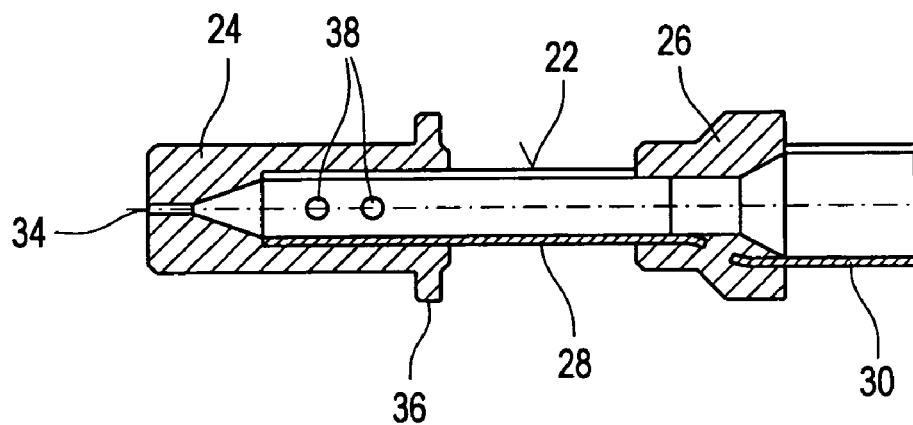
Figure 7:
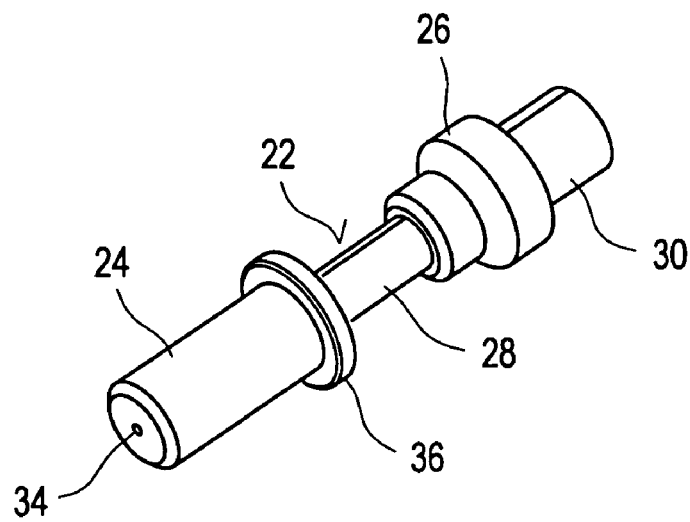

As can in particular be recognized with reference to FIGS. 5 to 7, at least the wall of the first tubular section 28 of the metal sleeve 22 can be provided with openings 28 into which some of the material of the first plastic molded part 24 engages.

Exposed regions 40, 42 of the two tubular sections 28, 30 of the metal sleeve 22 are crimped to the light guide 10.

The ferrule 20 can in particular be made from a stamped part in which at least the two tubular sections 28, 30 are produced by subsequent rolling.

The core of the light guide 10 preferably consists of glass fiber, with it in particular being able to consist of PCS (polymer clad silica).

The diameter of the core 12 of the light guide 10 can lie, for example, in a range from approximately 9 to 1,000 μm, with it preferably lying, however, in a range from approximately 200 μm.

As already mentioned, the light guide 10 can be provided at least regionally with at least one sheathing layer such as in particular a jacket layer 14, a buffer layer 16 and/or an outer layer or outer envelope 18.

If the light guide 10 is now provided in the region of the first tubular section 28 of the metal sleeve, 22 with, for example, a jacket layer 14 or with one such jacket layer 14 and a buffer layer 16, the internal diameter of the first tubular section of the metal sleeve 22 can substantially be equal to the external diameter of the jacket layer 14 or of the buffer layer 16.

The light guide 10 can be provided in the region of the second tubular section 30 of the metal sleeve 22 with, for example, a jacket layer 14, a buffer layer 16 and an outer layer 18. In this case, the internal diameter of the second tubular section 30 of the metal sleeve 22 is substantially equal to the external diameter of the outer layer 18.

The individual steps of the method in accordance with the invention for the mounting of the ferrule 20 on the light guide 10 result in particular from FIG. 6.

The metal sleeve 22 is then stamped out of a metal sheet. The stamped part is formed on a chain or on a strip 44 with a plurality of further identical stamped parts. The stamped part is then rolled to form the first and second coaxial tubular sections 28, 30 provided at an axial spacing from one another.

The first tubular section 28 has an internal diameter which is at least substantially equal to the external diameter of the jacket layer 14 or of the buffer layer 16 of the light guide 10. The second tubular section 30 has an internal diameter which is substantially equal to the external diameter of the outer envelope of the light guide 10. The two plastic molded parts 24, 26 are then molded onto axial positions on the metal sleeve 22 having a spacing from one another. The first plastic molded part 24 is formed around the end of the first tubular section 28, with it being able to be provided with a peripheral outer lip 36 and with an inner passage opening 34. The passage opening 34 is coaxial to the two tubular sections 28, 30 and has a minimum diameter which is substantially equal to the external diameter of the core or of the jacket layer 14 of the light guide 10.

The openings 38 in the first tubular section 28 have the effect that the first plastic molded part 24 adheres better to the first tubular section 28 or engages better to it. The second plastic molded part 26 is molded to the two tubular sections 28, 30 and over the region between the two tubular sections 28, 30. After the molding procedure has taken place and, for example, directly before the loading with the end of the light guide, the metal sleeve 22 is separated from the chain or the strip 44. Different layers are then removed from the end of the light guide. The light guide 10 is then introduced into the ferrule 20 from the second tubular section 30 until the core has reached the passage opening 34 of the first plastic molded part 24 or projects from it. Exposed regions of the two tubular sections 28, 30 are then crimped to the light guide 10.

After the crimping, the exposed end of the core can be cut off and worked. A ferrule 20 of a stable and robust design thus results with which the high precision required with respect to the manufacturing tolerances is ensured. The ferrule has an introduction opening for the light guide and pre-defined crimping regions and it can be formed without internal sharp edges. The metal part can be provided on a chain or on an strip for the subsequent automatic production of the ferrule.

The invention claimed is:

1. A ferrule for a light guide; the ferrule comprising:
 a continuous metal sleeve having a first tubular section and, at an axial spacing therefrom, a coaxial second tubular section which are connected to one another via an intermediate section;
 a first plastic molded part formed around a free end of the first tubular section and
 a second plastic molded part provided at an axial spacing from the first plastic molded part and formed around the ends of the two tubular sections adjacent to the intermediate section and around the intermediate section.

2. A ferrule in accordance with claim 1, wherein the first tubular section has a smaller internal diameter than the second tubular section.

3. A ferrule in accordance with claim 1 wherein the first plastic molded part has a passage opening coaxial to the two tubular sections of the continuous metal sleeve.

4. A ferrule in accordance with claim 1 wherein the first plastic molded part projects beyond the free end of the first tubular section of the continuous metal sleeve.

5. A ferrule in accordance with claim 3 wherein the passage opening has a smaller internal diameter than the two tubular sections of the continuous metal sleeve.

6. A ferrule in accordance with claim 1 wherein the first plastic molded part is provided with an outer lip.

7. A ferrule in accordance with claim 1 wherein the wall of the first tubular section of the metal sleeve is provided with openings into which some of the material of the first plastic molded part engages.

8. A ferrule in accordance with claim 1 wherein exposed regions of the two tubular sections of the metal sleeve are crimped to the light guide.

9. A ferrule in accordance with claim 1 wherein the two plastic molded parts are formed by a high-precision polymer such as a liquid crystal polymer (LCP).

10. A ferrule in accordance with claim 1 wherein the two tubular sections are produced from a stamped part and subsequently rolled.

11. A light guide with an associated ferrule in accordance with claim 1.

12. A light guide in accordance with claim 11, the light guide having a core comprised of glass fiber.

13. A light guide in accordance with claim 11 wherein the core of the light guide comprises polymer clad silica.

14. A light guide in accordance with claim 11 wherein a diameter of the core of the light guide lies in a range from approximately 9 to 1,000 μm.

15. A light guide in accordance with claim 11 wherein the light guide is provided at least regionally with at least one sheathing layer such as a jacket layer, a buffer layer and/or an outer layer.

16. A light guide in accordance with claim 15, wherein the light guide is provided in the region of the first tubular section of the metal sleeve with a jacket layer; and wherein the internal diameter of the first tubular section of the metal sleeve is substantially equal to the external diameter of the jacket layer or of the buffer layer.

17. A light guide in accordance with claim 15 wherein the light guide is provided in the region of the second tubular section of the metal sleeve with a jacket layer, a buffer layer and an outer layer; and wherein an internal diameter of the second tubular section of the metal sleeve is substantially equal to an external diameter of the outer layer.

18. A method for mounting a ferrule in accordance with claim 1 on a light guide comprising the steps of:
   stamping the metal sleeve out of a metal sheet:
   forming the two tubular sections of the metal sleeve by rolling the stamped part;
   molding of the first plastic molded part around the free end of the first tubular section of the metal sleeve; and
   molding the second plastic molded part around the ends of the two tubular sections adjacent to the intermediate section and around the intermediate section of the metal sleeve.

19. A method in accordance with claim 18 wherein the stamped part is formed on a conveyor chain or conveyor strip and the metal sleeve is separated from the conveyor chain or conveyor strip after the molding of the two plastic molded parts has taken place around the two tubular sections prior to the fitting with the end of the light guide.

20. A method in accordance with claim 18 wherein the free end of the light guide is inserted into the ferrule from the second tubular section of the metal sleeve up to the passage opening of the first plastic molded part or beyond it.

21. A method in accordance with claim 20, wherein after the insertion of the free end of the guide, the exposed regions of the two tubular sections of the metal sleeve are crimped to the light guide.

22. A method in accordance with claim 21, wherein the free end of the light guide is cut and worked after the crimping.

* * * * *